United States Patent [19]
Finn

[11] Patent Number: 5,269,255
[45] Date of Patent: Dec. 14, 1993

[54] ADJUSTABLE DEPTH FALSE FLOOR FOR BIRDHOUSE

[76] Inventor: Joseph Finn, 922 Massachusetts Ave., #53 Cambridge, Mass. 02139

[21] Appl. No.: 959,396
[22] Filed: Oct. 13, 1992
[51] Int. Cl.⁵ ............................................. A01K 31/00
[52] U.S. Cl. .................................................... 119/23
[58] Field of Search ................... 119/23, 45.1, 45.3, 119/52.2, 57.8

[56] References Cited

U.S. PATENT DOCUMENTS

| | | | |
|---|---|---|---|
| 1,634,209 | 6/1927 | Reiber | 119/23 |
| 1,748,349 | 2/1930 | Ijams | 119/23 |
| 3,053,226 | 9/1962 | Dunn | 119/23 |
| 3,643,631 | 2/1972 | Wade et al. | 119/23 |

Primary Examiner—Robert P. Swiatek

[57] ABSTRACT

A false floor for a bird nesting/feeding box, bearing on at least one of the inner side walls for support, conveniently adjustable to various depths by hand, and, being of minimal thickness, capable of remaining permanently within the bird box even when desirable to lower the bird nest protectively to distance it from the bird entry hole through which predators insert body parts to seize nest contents. The invention permits improved drainage, ventilation, parasite control, and more convenient and thorough cleaning. The invention permits more convenient adapting of a nesting box to a feeding box.

11 Claims, 4 Drawing Sheets

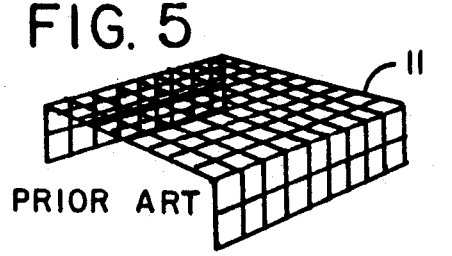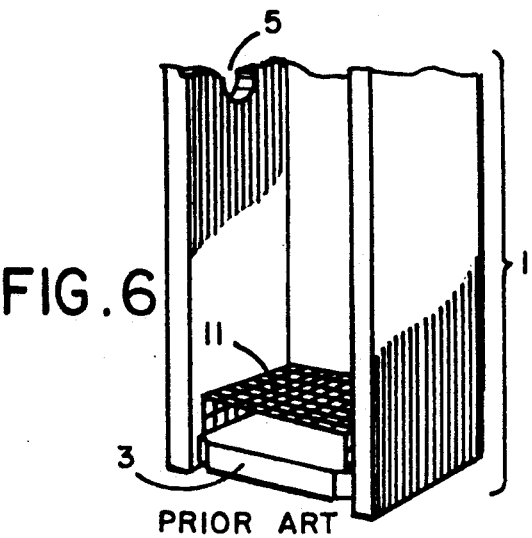

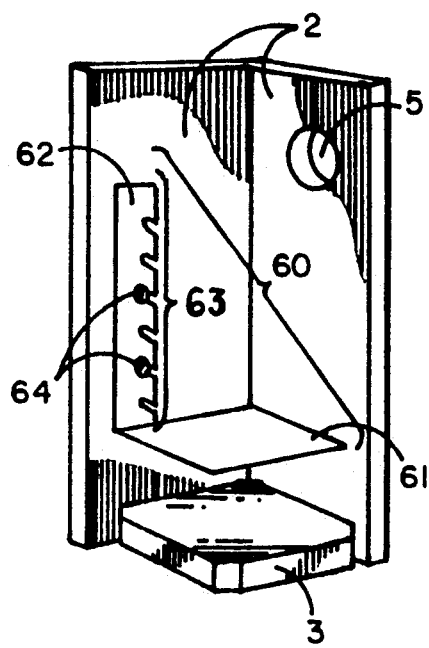
FIG. 17
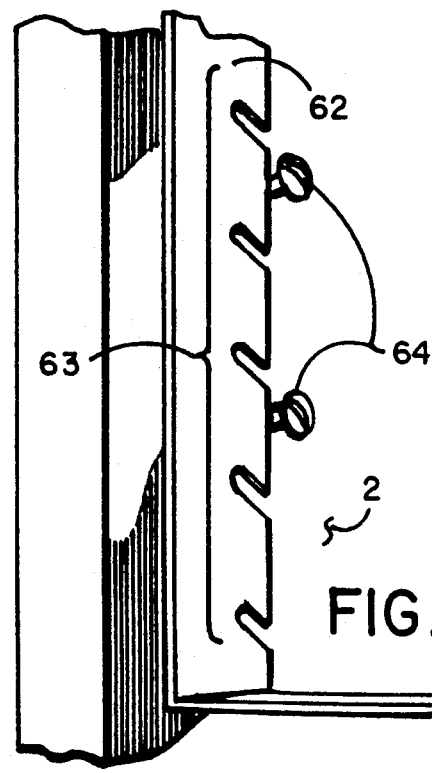
FIG. 18
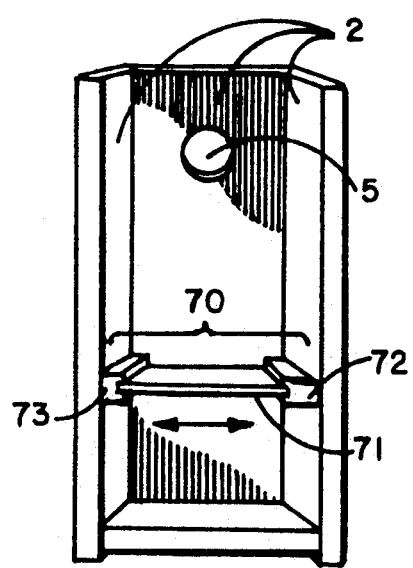
FIG. 19
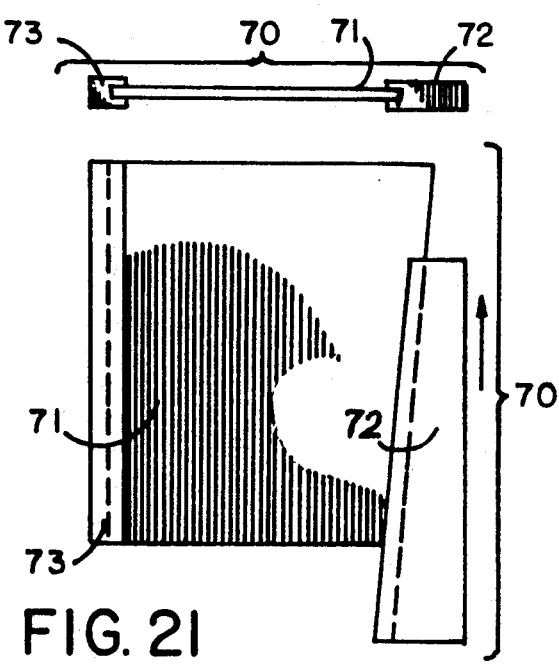
FIG. 20
FIG. 21

ADJUSTABLE DEPTH FALSE FLOOR FOR BIRDHOUSE

BACKGROUND OF THE INVENTION

1. Field of the Invention

The present invention relates generally to birdhouses and similarly configured feeders, and more specifically, to the convenient repeated depth adjustment capability of a false floor by means permanently containable within such structures to allow variation in depth settings for feeding, encouraging and protecting nestings of desirable birds, and discouraging nestings of undesirable birds.

2. Description of Prior Art

Various beneficial and desirable native birds, such as bluebirds and chickadees benefit from artificial nesting and feeding structures (bird houses and similarly constructed feeders; a bird house may also be considered a bird feeder if bird feed is placed inside an unoccupied nesting box and may be referred to as a birdhouse, birdbox, nesting box, feeding box, nesting/feeding box, or box. These structures are most beneficial with human management such as removal of old nests, undesirable birds' nests, parasites, etc. These structures are often, though not necessarily, built with four side wall panels, preferably with one side wall panel hinged or removable to permit access for human management. These structures are traditionally built with the floor at a permanently fixed depth below the bird entry hole. This fixed depth does not suit the varying biological conditions and purposes of these nesting/feeding boxes.

Predators such as raccoons and cats insert paws and forelegs through the bird entry holes of birdhouses, reaching down to seize nests, eggs, nestlings or incubating adults. Birdhouses built with greater fixed depth from bird entry hole to fixed floor may afford greater protection from this sort of predation, however some desirable birds demonstrate an aversion to nest in these deeper boxes. Those birds which do accept deeper boxes often negate the protective intent of the deeper box by filling the extra depth with additional nesting material, thus raising the egg cup at the top of the nest to a level dangerously close to the bird entry hole after all.

These deeper, built up nests are also unhealthy for desirable birds, as once dampened by driven rain, the nest will remain damp and cold longer, and harbor more blood sucking avian parasite blowfly larvae than will shallow nests. Some desirable birds such as bluebirds will cease nest building once the first egg is laid, and will then tolerate the lowering of the nest to a safer level. Wildlife managers sometimes lower the nest cup by inserting the fingers between the upper nest cup and the excess material of the lower portion of the nest, and removing the latter. This undermining may, however, disrupt the interwoven structure of the upper nest cup, and spillage of any removed material may attract predators by scent. This method is inconvenient, unsanitary, and exposes the hands to various pests which may inhabit the nest, such as mice, fleas, and ticks. For these reasons this method of lowering a nest is inferior to that permitted by the present invention.

Desirable native birds compete with undesirable destructive alien birds, such as English sparrows, for use of nesting boxes. English sparrows destroy nests, eggs, nestlings and incubating adults of native species while usurping nesting boxes intended for the latter. Ongoing field research suggests that while some desirable native birds such as bluebirds may prefer shallow nesting boxes, the undesirable English sparrow may have an aversion to shallow boxes.

A prior art device to vary the depth of bluebird houses to discourage nesting by English sparrows has been described in *Sialia*, the quarterly journal of the North American Bluebird Society in Volume 6, Number 1, pages 5-7, (Winter 1984). The device simply consists of one or more wood blocks placed or stacked on the fixed floor inside a birdhouse, prior to nest building, creating a shallow box less attractive to English sparrows but acceptable to bluebirds. The blocks may also be removed later to protectively lower the nest of desirable birds that build a shallow nest atop the blocks.

Just as some desirable birds are reluctant to enter a deep box to nest, some are reluctant to enter a deep box to feed, or are initially unable to discover feed placed low on the fixed floor of a deep box, away from the illumination of the bird entry hole.

A prior art device to lessen the depth of a bluebird nesting box, thereby adapting the box for use as a feeder, has been described in *Bluebird News*, a monthly wildlife management newsletter, on page 5 of the August 1989 issue. A small container, or wood blocks, are placed on the fixed floor inside a birdhouse. A feed tray is placed atop the container or blocks to hold bird feed closer to the bird entry hole, where it is more likely to be discovered by desirable birds. The description mentions that it may be necessary to lower the feed tray thereafter, if undesirable birds or animals too large to enter the feeding box attempt to reach the feed within.

These prior art depth adjustment devices, whether they be a container, other object, or one or more wood blocks simply placed on, or removed from, the fixed floor inside a nesting/feeding box, are inconvenient to use. These objects must be carried to or from the nesting/feeding box to effect a box depth adjustment, and must be handled and stored elsewhere when not in use in the box. This is especially inconvenient and unsanitary for those wildlife managers who maintain several, even hundreds, of boxes, often far afield. Also; removal of depth adjusting objects from a box may result in spillage of fine debris, creating a scent trail for predators leading back to the box. For these reasons prior art depth adjustment devices are inferior to the present invention.

As mentioned above, bird nests may become damp and often harbor the blood sucking parasitic larvae of the blowfly. Either condition is unhealthy for nestlings and may cause death.

A prior art device, described in *Sialia*, Volume 6, Number 2, page 70 (Spring, 1984), has been found to control both problems to some extent. This device is formed from a rectangle of hardware cloth (wire mesh) by making two right angle bends parallel to the two opposite short sides. This formed channel is inverted and stood on its legs which rest on the fixed floor of a birdhouse. (This elevated wire platform may be considered to be a form of false floor, though not intended for box depth adjustment. Some wildlife managers place a square of cardboard on this wire platform, hiding the unnatural looking wire until the nest building is complete.) The nest is built or retroactively placed on the wire platform. Rainwater which penetrates the nestbox will drain through the wire platform to the fixed floor, and out of the bottom of the box through drain holes drilled in or cut from the corners of the fixed floor. The airspace below the wire platform isolates the bottom of the nest from the damp fixed floor, and ventilates the underside of the nest and fixed floor, by permitting flow of air through the drainage holes. The drier nest is warmer for young nestlings and less hospitable to parasitic blowfly larvae. Also, larvae which fall through this wire mesh trap have some difficulty climbing back up to the nest. However, the legs of the wire platform may serve as a ladder, enabling some parasites to climb back up to the nest. The legs interfere somewhat with the free flow of water and air through drain holes cut from the corners of the fixed floor, limiting the beneficial drainage and ventilation effect. The legs also interfere with efforts to clean the surface below to remove trapped parasites and debris, unless the wire platform and nest are lifted. This prior art wire platform, dependent on legs bearing on the fixed floor for support, is inferior to the wire mesh or perforated platform support configuration permitted by the present invention.

SUMMARY OF THE INVENTION

It is, in general, an object of the present invention to provide a conveniently repeatable false floor depth adjustment capability and an improved means of support for a wire mesh or perforated drainage/ventilation/parasite trap, well integrated into bird nesting/feeding box design and permitting improved management practice, as specified in further objects stated below.

It is a further object of the present invention to provide repeatable false floor depth adjustment capability by means permanently containable within a nesting/feeding box through all biologically desirable depth settings, thereby eliminating the unsanitary and inconvenient handling, storage and carrying of depth adjusting objects to and from the box.

It is a further object of the present invention, by virtue of the permanent containability within a nesting/feeding box of these depth adjusting means, to minimize or eliminate spillage outside the box of scented debris, removed nest material, or feed, all of which could attract predators.

It is a further object of the present invention to provide false floor depth adjustment which is quickly and conveniently set by hand, requiring only minimal fingertip contact with the adjusting mechanism and unsanitary nest material.

It is a further object of the present invention to provide an improved means of support for the drainage/ventilation/parasite trap wire mesh or perforated platform, which improved support means will not interfere with drainage and ventilation through fixed floor corner drain holes, and will not assist the escape of trapped parasites nor interfere with cleaning of the surface below the wire mesh or perforated platform.

It is a further object of the present invention to permit more effective, convenient, and full integration of the potential functions of the (prior art) loose, thin, solid panel (the cardboard square sometimes placed on the wire mesh platform to temporarily hide the unnatural wire mesh until nestbuilding is complete). Thus it is an object to fully utilize a more durable version of this solid hiding panel for also holding feed, and catching falling parasites and debris below the elevated nest to permit a more convenient, thorough cleaning method.

It is a further object of the present invention to provide false floor depth adjusting means which are economical to manufacture and affordable to use in bird nesting/feeding boxes, traditionally inexpensive items often required in large numbers by wildlife managers. Therefore it is a further object to provide various embodiments of the present invention which vary in regard to cost of manufacture, convenience of use, or suitability for various applications such as inclusion in new box construction versus retrofitting of old boxes.

The present invention fulfills the foregoing objects in specific ways to be described after this brief description of the general form and function common to the various embodiments: all embodiments rely on at least one of the box vertical side walls for support of the adjustable depth horizontal false floor. The horizontal false floor may be grasped with the thumb and fingers and moved up or down within the box and re-set at a different desired depth. The minimal thickness of the false floor permits use of very nearly the full potential fixed box depth when adjusted all the way down. The minimal thickness of the false floor permits a beneficial space below the nest to be maintained when adjusted to be slightly above the fixed floor, while still affording just slightly less than full box depth. This beneficial space is clear of obstruction.

The present invention eliminates the need for unsanitary and inconvenient handling, storage, and carrying of depth adjusting objects to and from the box. As the minimal thickness of the false floor of the present invention permits use of very nearly the full potential fixed box depth when adjusted down, it is not necessary to remove the present invention when protectively lowering a nest or feed tray. As the false floor may be permanently contained within the box, it is not necessary to store or carry false floor depth adjusting objects back to the box when desirable to raise a false floor for the next nesting or feeding cycle.

The present invention, by virtue of this permanent containability of the depth adjusting means within a nesting/feeding box, minimizes the chance of spillage outside the box of scented debris, removed nest material, or feed, all of which could attract predators.

The present invention, by virtue of simply engaging and disengaging adjustment means, permits quick and convenient depth adjustment by hand, with only minimal thumb and fingertip contact with the adjusting means and unsanitary nest material.

The present invention, by virtue of side wall support of a false floor of minimal thickness, permits unobstructed space below the nest when so adjusted. When the present invention false floor is of wire mesh or perforated construction, rainwater which inadvertently enters the box and drains through to the surface below will then more freely drain out drain holes cut from the corners of the fixed floor without the obstruction (dam effect) caused by debris collecting around the prior art wire mesh platform support legs. Ventilation of the underside of the nest through corner drain holes is similarly enhanced. Elimination of support legs also eliminates a means of escape for fallen trapped parasites attempting to climb back up to the nest. Elimination of support legs permits convenient cleaning of the fixed floor when the false floor is, or has been, in a position spaced above the fixed floor. A broad, thin, horizontally hand-held tool can be inserted in the unobstructed space to quickly scrape fallen parasites and debris from the fixed floor into a hand-held small plastic bag for removal from the site. No third hand is needed to lift the obstructing support legs as is needed when cleaning under the prior art wire mesh platform.

The present invention, by virtue of side wall support of a false floor of minimal thickness, permits more effective, convenient, and full potential use of the simple prior art device (cardboard square) sometimes used to hide the unnatural-looking wire mesh until nest building is complete. A thin panel, sized slightly smaller than the fixed floor (preferably of a material more durable than cardboard), may be placed loosely atop a wire mesh or perforated version of the false floor of the present invention to more effectively hold feed or to hide the wire/perforated false floor until nesting is complete. This thin panel may then be easily slid out from under the nest and placed below the wire/perforated false floor on the fixed floor to catch fallen parasites and debris. It may thereafter be slid out and tipped into a hand-held plastic bag and then returned atop the fixed floor, thereby very conveniently cleaning the birdhouse floor. This multi-use thin panel may also be re-inserted between the wire/perforated false floor if ventilation of the underside of the nest is not desirable due to a return of unseasonably cold weather. Thus the present invention permits and suggests this fuller, more convenient, and beneficial use of this simple prior art device.

The present invention is provided in various embodiments which vary in cost of manufacture, convenience of use, or suitability for new construction versus retrofitting of old nesting/feeding boxes.

While adjustable support of a false bottom of minimal thickness by at least one interior side wall is of fundamental importance in fulfilling the objects of the present invention, this adjustable side wall support may be embodied in many forms which exemplify the principles of the invention. Some of the possible embodiments will be described briefly here and more thoroughly in the Detailed Description to follow later.

In one embodiment, a vertically slotted vertical adjusting extension is connected at a right angle to the horizontal false floor. This slotted vertical adjusting extension is frictionally but movably held against at least one side wall by at least one fastener passing through the vertical slot. A washer or friction plate beneath the head of the fastener may be incorporated to provide smooth movement. The slot and fasteners allow vertical movement when fingertip pressure is applied, but pre-set friction, applied by the adjustment of the fasteners (typically screws) bearing on the slotted vertical adjusting extension holding it frictionally against the inside side wall surface, will retain the relatively lightweight false floor assembly with nest and contents at a desired adjusted depth.

In a similar embodiment, a plain vertical adjusting extension is connected at a right angle to the horizontal false floor. This plain vertical extension is held against at least one inside wall surface by a friction/guide clip attached to the wall. The friction/guide clip allows vertical movement of the false floor when fingertip pressure is applied, but pre-set friction of the friction/guide clip, bearing on the plain vertical extension of the false floor assembly will retain the false floor assembly at a desired adjusted depth.

In another embodiment, a similar vertical extension is again connected at a right angle to the horizontal false floor. This vertical extension, however, is formed at regularly spaced intervals to engage corresponding regularly spaced mating formations on at least one of the inside walls. These corresponding regularly spaced mating formations extend up and down to permit fingertip controlled engagement and disengagement at varying depths.

In another embodiment, a horizontal extension is connected to or supportive of the horizontal false floor. The male horizontal support extension is formed to matingly engage female formations spaced up and down at least one wall to permit fingertip controlled withdrawal and reinsertion to adjust depth. This embodiment would be well suited for economical manufacture in new boxes as the female formations could take the form of drilled holes or deep horizontal saw kerfs machined in the inner wall surface of the (typically wooden) nesting/feeding box.

In another embodiment, the horizontal false floor is supported by wedge, compression, or spring pressure, or some combination of these forces, exerted by a mechanism built into the false floor, and bearing on opposing wall surfaces. As bird nests and contents are very light in weight, a minimum of easily exertable and releasable pressure on the side walls would support the false floor and yet permit quick and convenient depth adjustment by hand. This embodiment would be well suited to retrofitting standard sized old boxes in the field.

Each of the foregoing embodiments briefly described above fulfills the objects of the invention.

BRIEF DESCRIPTION OF THE DRAWINGS

FIG. 5 is an enlarged perspective view of the prior art wire mesh drainage/ventilation/parasite trap platform.

FIG. 6 is a perspective view of box (one side wall removed and upper portion cut away) showing prior art wire mesh in place on fixed floor of box.

FIG. 7 is a perspective view of nesting/feeding box interior with two side walls and roof removed to show slotted false floor assembly at a greater depth position.

FIG. 8 is a perspective view of box interior with two side walls and roof removed to show slotted false floor assembly being manually adjusted to an intermediate depth position.

FIG. 9 is a perspective view of box interior with two side walls and roof removed to show slotted false floor assembly at a lesser depth position.

FIG. 10 is an enlarged detail perspective view of the retaining/aligning fasteners, friction plate and portion of slotted vertical adjusting extension.

FIG. 17 is a perspective view of box interior with two side walls and roof removed to show notched false floor assembly with solid false floor variation set at an intermediate depth position.

FIG. 18 is an enlarged detail perspective view of portion of side wall and notched vertical adjusting extension barely disengaged from engaging formations.

FIG. 19 is a view of a box interior with one side wall and roof removed to show wedge/compression false floor assembly set at an intermediate depth position. Double arrow shows direction of wedge/compression force on opposing walls.

FIG. 20 is an elevation view of wedge/compression false floor assembly.

FIG. 21 is a plan view of wedge/compression false floor assembly with wedge in released position. Arrow shows direction of wedge movement to compress assembly against opposing sidewalls.

DESCRIPTION OF THE PREFERRED EMBODIMENT

A brief explanation of the prior art in reference to the drawings will provide an understanding of the objects of the invention and the limitations of the prior art (FIG. 1 to FIG. 6).

Figure 1:
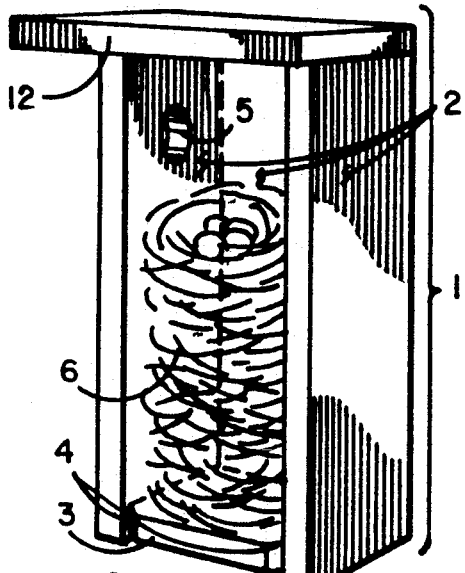
FIG. 1 is a perspective view of a bird nesting/feeding box with one side wall removed showing a naturally occurring bird nest built up dangerously close to the bird entry hole.

Referring to the drawings, FIG. 1 shows typical nesting/feeding box 1 with one side wall removed to expose the interior, as might occur in opening such a box. In addition to the removed side wall, remaining side walls 2, roof 12, and fixed floor 3 typically form such a box. Corner drain holes 4 have been cut from the corners of fixed floor 3. Fixed floor 3 is at a permanently fixed depth below bird entry hole 5. Built up bird nest 6 is dangerously close to bird entry hole 5.

Figure 2:
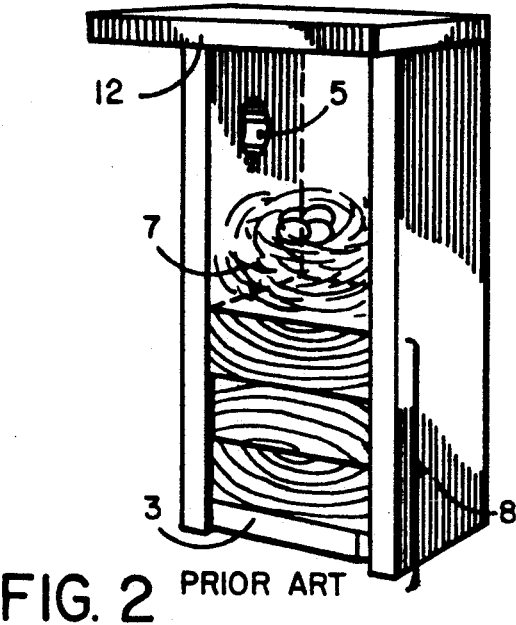
FIG. 2 is a perspective view of a bird box with one side wall removed showing a shallow nest built on prior art depth adjusting removable wooden blocks.

FIG. 2 shows shallow bird nest 7 dangerously close to bird entry hole 5, having been built on depth adjusting wood blocks 8, previously placed on fixed floor 3.

Figure 3:
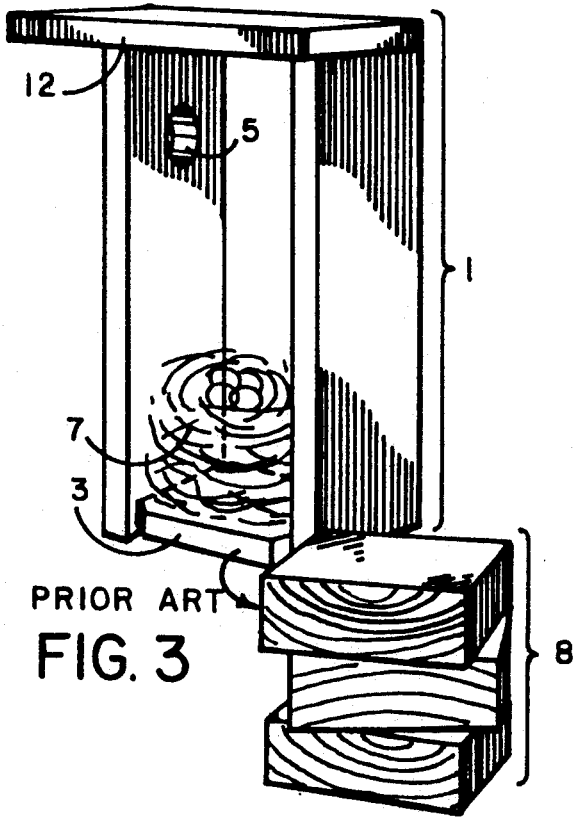
FIG. 3 is a perspective view of box (one side wall removed) showing prior art depth adjusting wooden blocks removed and nest lowered to safer level.

FIG. 3 shows depth adjusting wood blocks 8 removed from fixed floor 3 of nesting/feeding box 1, and shallow bird nest 7 lowered to a safer level on fixed floor 3.

Figure 4:
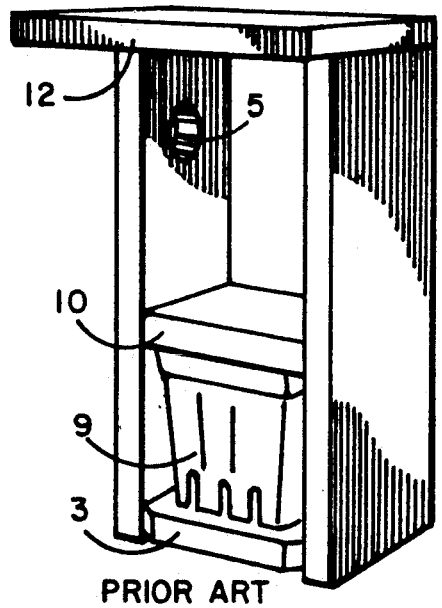
FIG. 4 is a perspective view of box (one side wall removed) showing a prior art container supporting a feed tray relatively closer to the bird entry hole.

FIG. 4 shows container 9 resting on fixed floor 3 to support feed tray 10 in a position closer to bird entry hole 5.

FIG. 5 shows wire mesh platform (with legs) 11.

FIG. 6 shows wire mesh platform (with legs) 11 installed on fixed floor 3 of nesting/feeding box 1 (shown with top cut away) as it would be under a bird nest.

While the invention may be embodied in many different forms, a preferred embodiment is illustrated and will be described in specific form with the understanding that the disclosure is to be considered as an exemplification of the principles of the invention and is not intended to limit the invention to the specific embodiment illustrated and described.

Referring to the drawings again, FIG. 7 shows slotted false floor assembly 20 attached to one of side walls 2. It is set at a depth position whereby perforated false floor 21 is spaced at a great distance from bird entry hole 5 and yet spaced at a slight distance from fixed floor 3. A shallow nest built at a lesser depth position (as shown in FIG. 9) would be protected when lowered to the position shown in FIG. 7. The space between perforated false floor 21 and fixed floor 3 is clear of obstruction, and therefore beneficial as described previously.

As shown in FIG. 7, slotted false floor assembly 20 is formed from horizontal perforated false floor 21, which is slightly smaller than fixed floor 3 and of a shape corresponding to the shape of fixed floor 3 (often square), and slotted vertical adjusting extension 22 which is connected at a right angle to perforated false floor 21. Adjusting slot 23 is formed in slotted vertical adjusting extension 22 along a line perpendicular to the line which defines the intersection of the plane of horizontal perforated false floor 21 and the plane of slotted vertical adjusting extension 22. When slotted false floor assembly 20 is positioned and attached to one of the side walls 2, by retaining/aligning fasteners 24 aligned vertically on side wall 2 and passing through adjusting slot 23, adjusting slot 23 is held in a parallel alignment with the planes and corners of the side walls 2 and slotted vertical adjusting extension 22 is held against one of the side walls 2, while perforated false floor 21 is held in a horizontal plane parallel to fixed floor 3.

Adjustment of retaining/aligning fasteners 24 (which may simply be round headed screws) may pre-set a greater or lesser pressure of the retaining/aligning fastener 24 bearing on the slotted vertical adjusting extension 22 which in turn bears on side wall 2. This pre-set pressure may allow vertical movement of slotted false floor assembly 20 up and down within a nesting/feeding structure by hand but with sufficient but slight friction to hold a relatively lightweight bird nest and contents at a desired depth setting.

FIG. 8 shows slotted false floor assembly 20 being manually adjusted through an intermediate depth position to a lesser depth position as shown in FIG. 9. This lesser depth position, whereby the perforated false floor 21 is closer to bird entry hole 5, would be appropriate for inducing certain desirable birds to begin to nest or feed. Through the range of possible depth positions, perforated false floor 21 is maintained parallel to fixed floor 3.

FIG. 10 shows a detail of the adjustable friction attachment of sliding slotted vertical adjusting extension 22 to side wall 2 by vertically aligned and spaced retaining/aligning fasteners 24 passing through adjusting slot 23. Optional friction plate 25 (or ordinary washer) may be incorporated as shown in FIG. 10 to permit smooth sliding movement.

Figure 11:
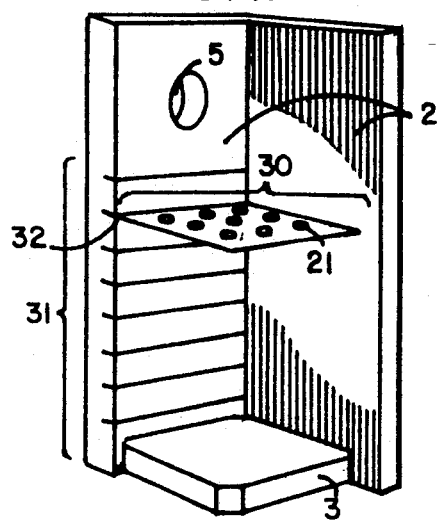
FIG. 11 is a perspective view of box interior with two side walls and roof removed to show flat false floor assembly set in one of the horizontal adjusting grooves at a lesser depth position.
Figure 12:
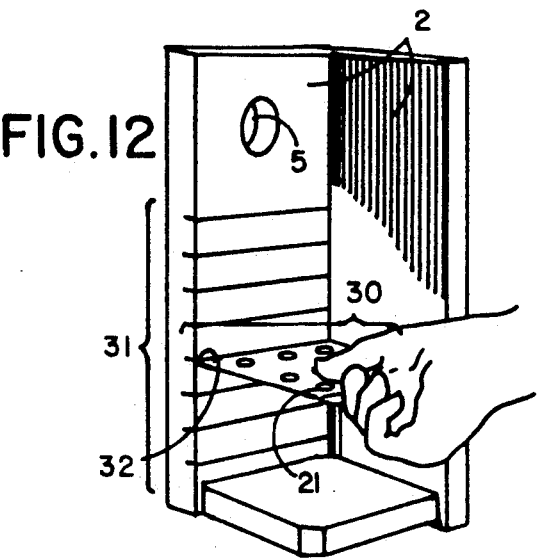
FIG. 12 is a perspective view of box interior with two side walls and roof removed to show flat false floor assembly being inserted at an intermediate depth position.
Figure 13:
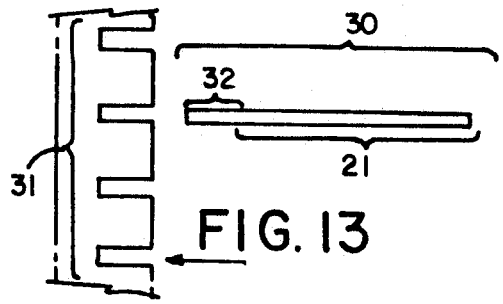
FIG. 13 is a an enlarged detail side elevation view of a portion of a side wall with horizontal adjusting grooves and flat false floor assembly.

A valuable alternative embodiment shown in FIG. 11, FIG. 12, and FIG. 13 fulfills the objects of the invention by a different means.

In FIG. 11, one of the side walls 2 is preferably of greater thickness to accommodate horizontal adjusting grooves 31 spaced regularly between the bird entry hole 5 and fixed floor 3. These horizontal adjusting grooves 31 may be deeply cut saw kerfs economically machined at time of manufacture. If formed on the same side wall 2 in which the bird entry hole 5 is located, these horizontal adjusting grooves 31 can serve a beneficial dual purpose also as a toe hold ladder for birds climbing from low in a nesting/feeding box up to exit through the bird entry hole 5. (Some birds are fatally trapped in smooth walled structures, and better prior art boxes have knife cuts or very shallow single purpose saw kerfs to aid birds in climbing to the entry/exit hole.)

FIG. 13 shows a side elevation detail of a thicker side wall 2 with spaced horizontal adjusting grooves 31. Flat false floor assembly 30 is shown to correspond in thickness approximately to the width of horizontal adjusting grooves 31, to permit easy insertion of the horizontal adjusting extension 32 into any of horizontal adjusting grooves 31. Perforated false floor 21, in this embodiment, may be formed economically in one piece with horizontal adjusting extension 32 to create flat false floor assembly 30 from a stiff durable material such as sheet metal or plastic.

FIG. 11 shows flat false floor assembly 30 inserted into one of horizontal adjusting grooves 31, with horizontal adjusting extension 32 hidden from view in horizontal adjusting groove 31. Perforated false floor 21 is thus supported at a lesser depth setting parallel to the plane of fixed floor 3.

FIG. 12 shows manual insertion of flat false floor assembly 30 into another of the horizontal adjusting grooves 31 for an intermediate depth setting.

Figure 14:
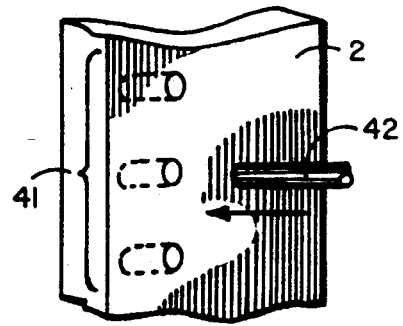
FIG. 14 is a perspective detail view of a portion of a side wall with spaced adjusting holes and adjusting pin false floor support variation.

FIG. 14 shows in a detail perspective view how spaced adjusting holes 41 formed in one of the side walls are capable of accepting adjusting pin 42, which pin may be an extension of or supportive of a false floor not shown.

Figure 15:
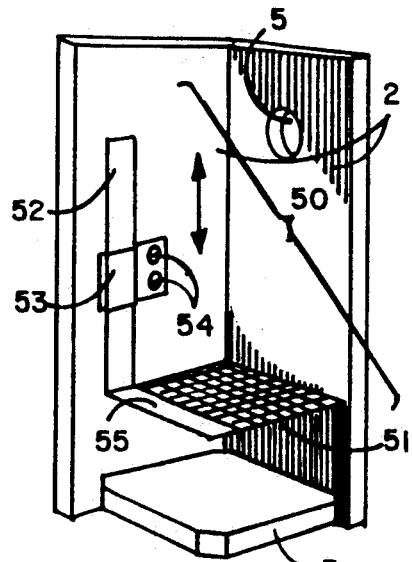
FIG. 15 is a perspective view of box interior with two side walls and roof removed to show plain false floor assembly set at an intermediate depth position.

FIG. 15 shows another alternative embodiment similar to the preferred embodiment of FIG. 7 through FIG. 10 in that it has a frictionally held, vertically adjustable, sliding mechanism to set depth of a false floor. Plain false floor assembly 50 is formed of horizontal support 55 supporting flat wire mesh false floor variation 51 (which may be welded together) and plain vertical adjusting extension 52.

Figure 16:
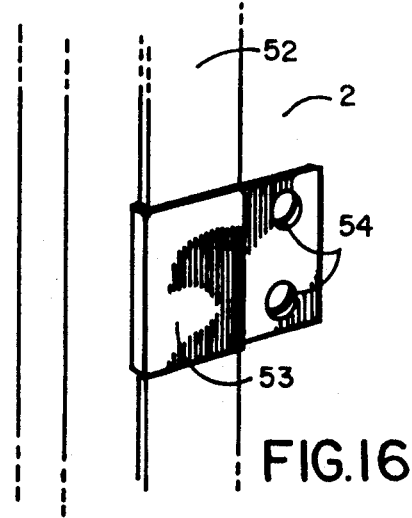
FIG. 16 is an enlarged detail perspective view of portion of side wall and plain vertical adjusting extension retained by friction guide clip and fasteners.

FIG. 16 shows how friction guide clip 53 is attached by fasteners 54 to side wall 2 to hold plain vertical adjusting extension 52 against side wall 2 thereby permitting smooth guided vertical movement.

FIG. 17 shows another embodiment wherein notched false floor assembly 60 is vertically adjustable in a nesting/feeding box. Solid false floor variation 61 is connected at a right angle to notched vertical adjusting extension 62. Adjusting notches 63 regularly formed along one vertical edge of notched vertical adjusting extension 62 correspond with engaging formations 64 spaced vertically on one of the side walls 2.

FIG. 18, a perspective detail view, shows the upwardly angled notches barely disengaged from engaging/retaining formations as is done when shifting from one depth setting to another.

FIG. 19 shows how a different alternative embodiment might be used to vary the depth of a box. As mentioned previously, releasable wedge, compression, or spring pressure exerted by a false floor assembly against opposite inner side walls to hold a false floor at a desired depth could be considered to be a means of fulfilling the objects of the invention. As an exemplification, wedge/compression false floor assembly 70 bears on two of the opposing side walls 2 to hold the relatively light weight of a bird nest and contents. Tapered false floor panel 71 is held by pressure of compressed compression strip 73 (rubber or similar material) and wedge 72 against opposing side walls 2. The double arrow shows the direction of the holding force.

FIG. 20 shows an elevation view of wedge/compression false floor assembly 70 comprised of tapered false floor panel 71, wedge 72, and compression strip 73.

FIG. 21 is a plan view of wedge/compression false floor assembly 70 with wedge 72 released to adjust depth. The arrow shows the direction of movement for the groove guided wedge 72 to tighten the wedge/compression false floor assembly 70 against opposing walls when so set in a box.

I claim:

1. A false floor assembly for supporting a bird nest or feed tray in a bird nesting and feeding box, said nesting and feeding box having a roof and vertical parallel side walls with a bird entry hole defined in at least one of said side walls near to said roof, and a fixed floor spaced away from said roof and said bird entry hole, said false floor assembly comprising:

a substantially planar horizontal false floor of minimal thickness, slightly smaller but corresponding in shape to said fixed floor; and false floor support means associated with both said false floor and at least one of said side walls, said false floor support means supporting said false floor by engagement with at least one of said side walls, said false floor support means permitting convenient repeatable manual adjustment of said false floor at depth positions both nearer to and further away from said bird entry hole, said false floor support means and said false floor being permanently containable within said bird nesting and feeding box even when adjusted to a greater depth position further from said bird entry hole.

2. A false floor assembly for supporting a bird nest or feed tray in a bird nesting and feeding box, said nesting and feeding box having a roof and vertical parallel side walls with a bird entry hole defined in at least one of said side walls near to said roof, and a fixed floor spaced away from said roof and said bird entry hole, said false floor assembly comprising:

a substantially planar horizontal false floor of minimal thickness, slightly smaller but corresponding in shape to said fixed floor;

means for the support and depth adjustment of said false floor including:

a vertical adjusting extension connected at a right angle to said false floor; and retaining means attaching and retaining said vertical adjusting extension proximate to at least one of said side walls, said retaining means allowing manually effected vertical sliding movement of said vertical adjusting extension and said false floor relative to said retaining means, said retaining means being fixed at a position on at least one of said side walls, said retaining means permitting frictional retention of said vertical adjusting extension and attached false floor at desired depth positions, said retaining means permitting convenient repeatable manual adjustment of said false floor at depth positions both nearer to and further away from said bird entry hole, and said retaining means and said false floor being permanently containable within said bird nesting and feeding box even when adjusted to a greater depth position further from said bird entry hole.

3. The false floor assembly of claim 2 wherein retention of said vertical adjusting extension is accomplished by at least one adjustable retaining/aligning fastener passing through an adjusting slot formed in said vertical adjusting extension.

4. The false floor assembly of claim 3 wherein said at least one adjustable retaining/aligning fastener has a head and wherein a flat friction plate is included between the head of at least one of said retaining/aligning fasteners and said slotted vertical adjusting extension to enhance smooth sliding movement and frictional retention at desired depth positions.

5. The false floor assembly of claim 2 wherein retention of said vertical adjusting extension is accomplished by a friction guide clip which wraps at least partially around said vertical adjusting extension and is attached to at least one of said side walls.

6. A false floor assembly for supporting a bird nest or feed tray in a bird nesting and feeding box, said nesting and feeding box having a roof and vertical parallel side walls with a bird entry hole defined in at least one of said side walls near to said roof, and a fixed floor spaced away from said roof and said bird entry hole, said false floor assembly comprising:
   a substantially planar horizontal false floor of minimal thickness, slightly smaller but corresponding in shape to said fixed floor;
   means for support and depth adjustment of said false floor including at least one horizontal male formation associated with and capable of supporting said false floor and a plurality of corresponding female formations spaced up and down at least one of said side walls into which female formations said at least one male formation is selectively insertable, said means for support and depth adjustment permitting convenient repeatable manual adjustment of said false floor at depth positions both nearer to and further away from said bird entry hole, said means for support and depth adjustment and said false floor being permanently containable within said bird nesting and feeding box even when adjusted to a greater depth position further from said bird entry hole.

7. A false floor assembly for supporting a bird nest or feed tray in a bird nesting and feeding box, said nesting and feeding box having a roof and vertical parallel side walls with a bird entry hole defined in at least one of said side walls near to said roof, and a fixed floor spaced away from said roof and said bird entry hole, said false floor assembly comprising:
   a substantially planar horizontal false floor of minimal thickness, slightly smaller but corresponding in shape to said fixed floor; and
   means for support and depth adjustment of said false floor including at least one flat horizontal male extension formation associated with and capable of supporting said false floor and a plurality of corresponding female formations spaced up and down at least one of said side walls into which female formations said at least one male formation is selectively insertable, said means for support and depth adjustment permitting convenient repeatable manual adjustment of said false floor at depth positions both nearer to and further away from said bird entry hole, said means for support and depth adjustment and said false floor being permanently containable within said bird nesting and feeding box even when adjusted to a greater depth position further from said bird entry hole.

8. A false floor assembly for supporting a bird nest or feed tray in a bird nesting and feeding box, said nesting and feeding box having a roof and vertical parallel side walls with a bird entry hole defined in at least one of said side walls near to said roof, and a fixed floor spaced away from said roof and said bird entry hole, said false floor assembly comprising:
   a substantially planar horizontal false floor of minimal thickness, slightly smaller but corresponding in shape to said fixed floor; and
   means for the support and depth adjustment of said false floor including at least one horizontal male cylindrical pin associated with and capable of supporting said false floor and a plurality of corresponding female adjusting holes spaced up and down at least one of said side walls into which adjusting holes said at least one pin is selectively inserted, said means for support and depth adjustment permitting convenient repeatable manual adjustment of said false floor at depth positions both nearer to and further away from said bird entry hole, said means for support and depth adjustment and said false floor being permanently containable within said bird nesting and feeding box even when adjusted to a greater depth position further from said bird entry hole.

9. A false floor assembly for supporting a bird nest or feed tray in a bird nesting and feeding box, said nesting and feeding box having a roof and vertical parallel side walls with a bird entry hole defined in at least one of said side walls near to said roof, and a fixed floor spaced away from said roof and said bird entry hole, said false floor assembly comprising:
   a substantially planar horizontal false floor of minimal thickness, slightly smaller but corresponding in shape to said fixed floor;
   means for the support and depth adjustment of said false floor including:
     a vertical adjusting extension connected at a right angle to said false floor, said vertical adjusting extension having a vertical edge; and
     retaining means attaching and retaining said vertical adjusting extension proximate to at least one of said side walls by at least one male engaging/retaining formation attached to said side wall and corresponding to at least one adjusting notch formed into said vertical edge of said vertical adjusting extension, said retaining means permitting convenient repeatable manual adjustment of said false floor at depth positions both nearer to and further away from said bird entry hole, and said retaining means and said false floor being permanently containable within said bird nesting and feeding box even when adjusted to a greater depth position further from said bird entry hole.

10. A false floor assembly for supporting a bird nest or feed tray in a bird nesting and feeding box, said nesting and feeding box having a roof and vertical opposing parallel side walls and front and rear walls with a bird entry hole defined in said front wall near to said roof, and a fixed floor spaced away from said roof and said bird entry hole, said false floor assembly comprising:
   a substantially planar horizontal false floor of minimal thickness, slightly smaller but corresponding in shape to said fixed floor;
   false floor support means associated with said false floor and at least one of said side walls, said false floor support means supporting said false floor including a tapered false floor panel and correspondingly tapered wedge matingly guided to permit sliding release and engagement to exert retaining pressure on said two opposing parallel side walls; and said false floor support means permitting convenient repeatable manual adjustment of said false floor at depth positions both nearer to and further away from said bird entry hole, said false floor support means and said false floor being permanently containable within said bird nesting and feeding box even when adjusted to a greater depth position from said bird entry hole.

11. A false floor assembly for supporting a bird nest or feed tray in a bird nesting and feeding box, said nesting and feeding box having a roof and vertical opposing parallel side walls and front and rear walls with a bird entry hole defined in said front wall near to said roof, and a fixed floor spaced away from said roof and said bird entry hole, said false floor assembly comprising:

a substantially planar horizontal false floor of minimal thickness, slightly smaller but corresponding in shape to said fixed floor; and false floor support means associated with said false floor and said side walls, said false floor support means supporting said false floor by having a compression strip of resilient material attached along at least one edge of said false floor to exert retaining pressure on said two opposing parallel side walls, said false floor support means permitting convenient repeatable manual adjustment of said false floor at depth positions both nearer to and further away from said bird entry hole, said false floor support means and said false floor being permanently containable within said bird nesting and feeding box even when adjusted to a greater depth position further from said bird entry hole.

* * * * *